April 10, 1956
P. A. RAICHE
2,741,311
MACHINE FOR CENTERING NIPPLES AND PUNCHING
VENT OPENINGS THERETHROUGH
Filed March 20, 1952
6 Sheets-Sheet 4
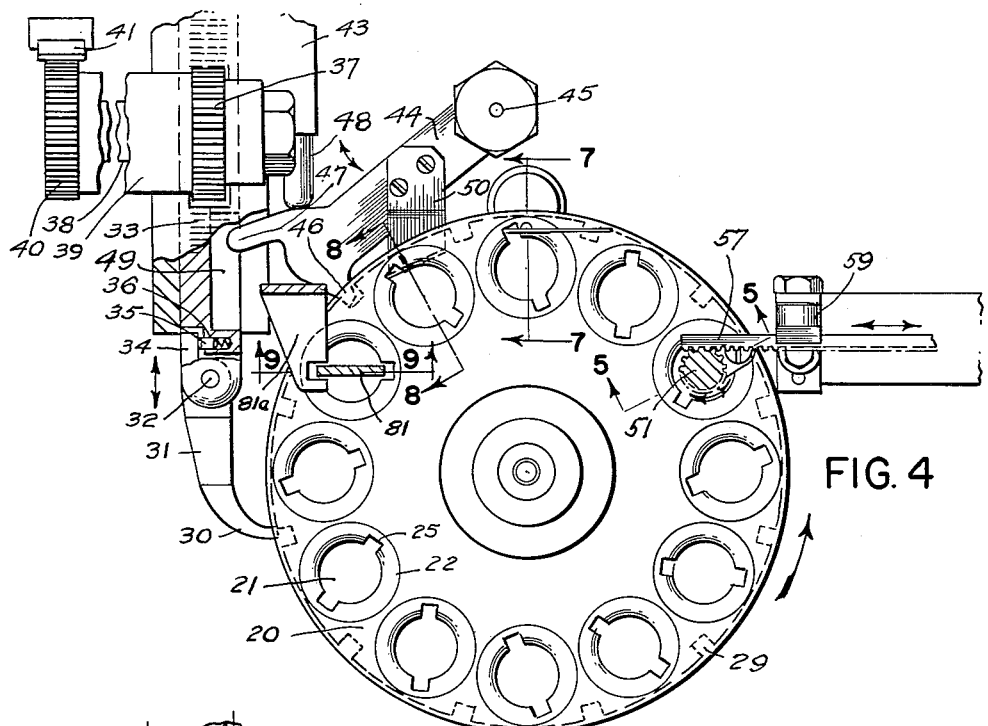
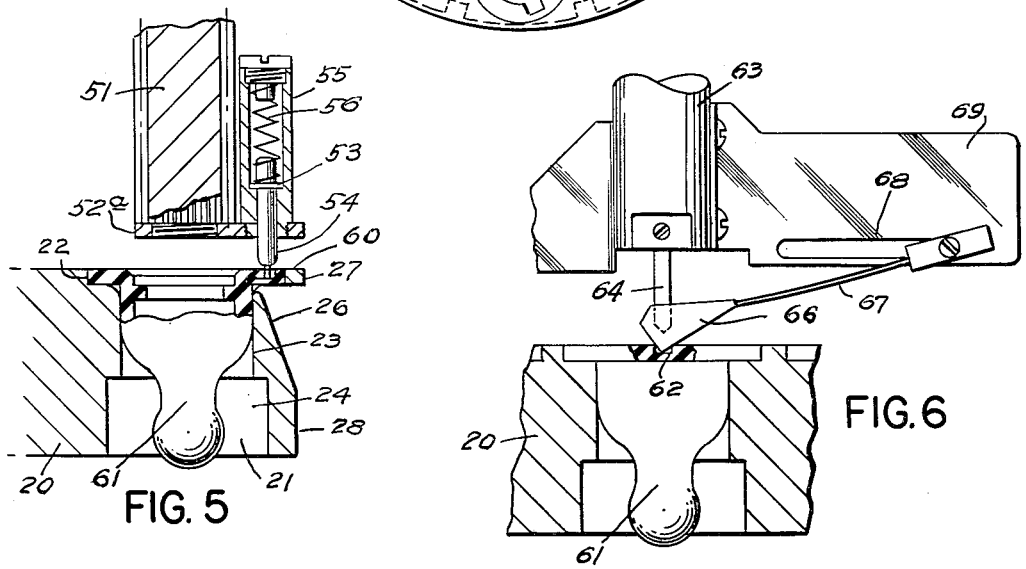
INVENTOR.
Paul A. Raiche
BY Nathaniel Frucht
ATTORNEY

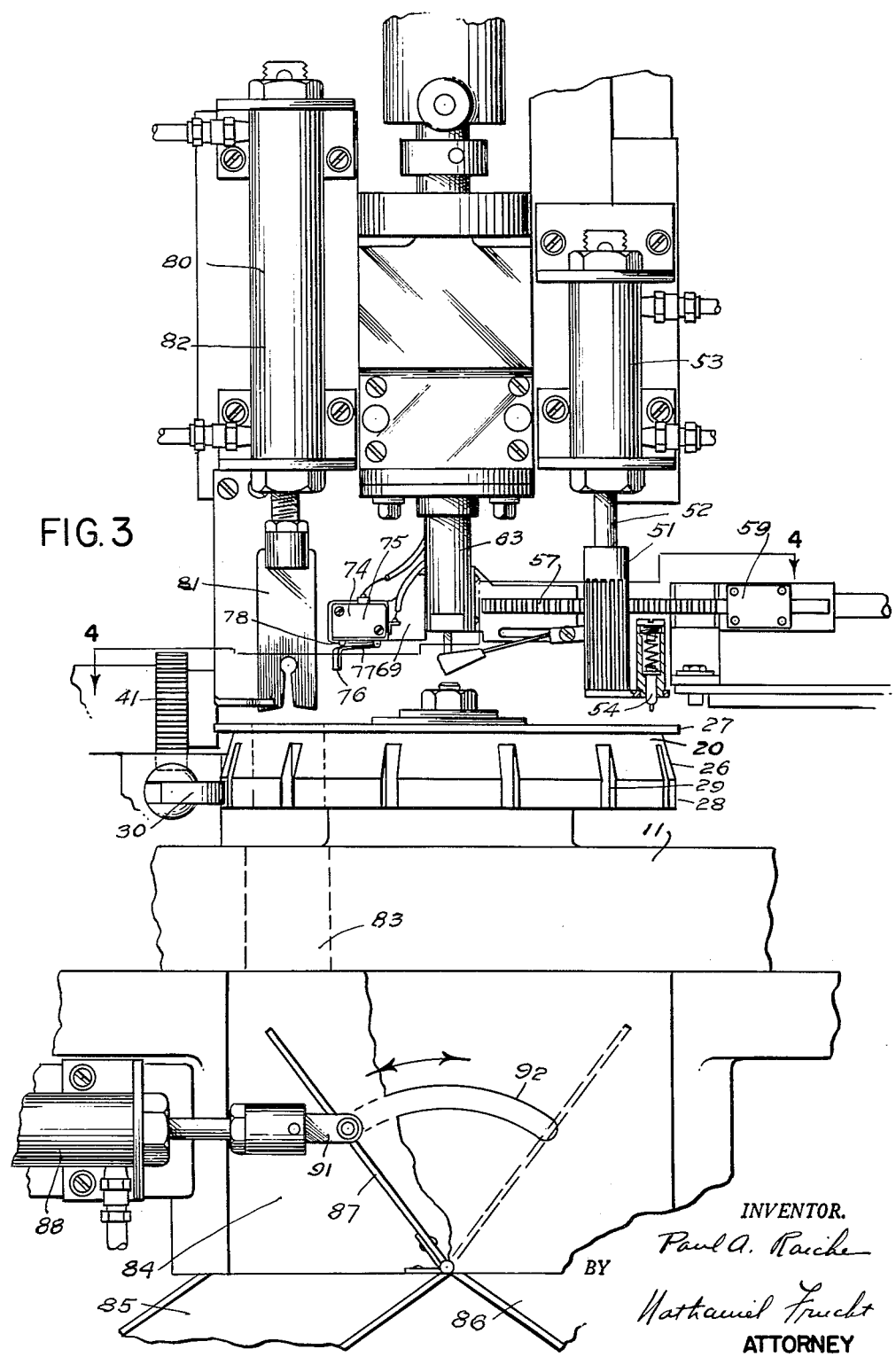

April 10, 1956  P. A. RAICHE  2,741,311
MACHINE FOR CENTERING NIPPLES AND PUNCHING
VENT OPENINGS THERETHROUGH
Filed March 20, 1952  6 Sheets-Sheet 5
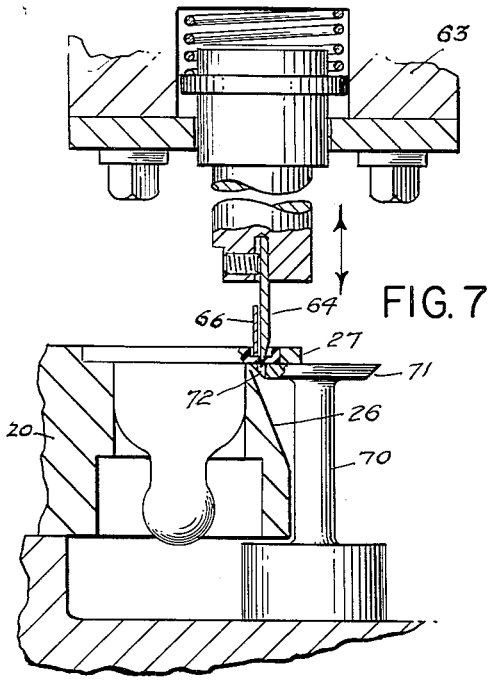
FIG. 7
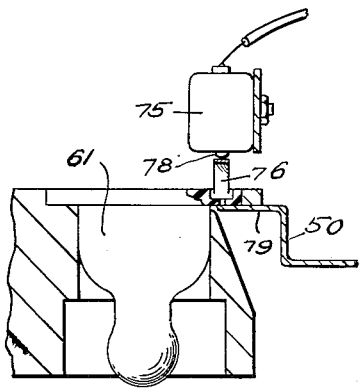
FIG. 8
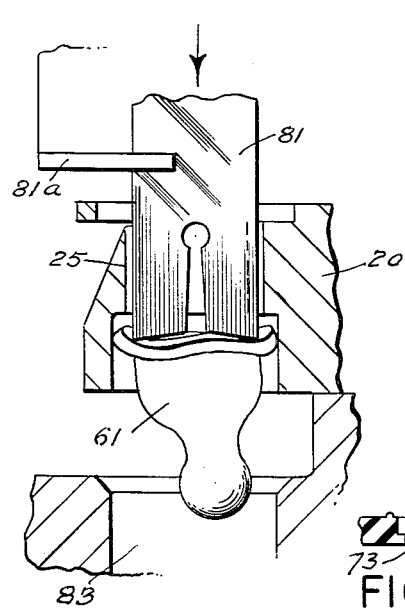
FIG. 9
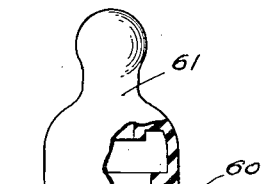
FIG. 10
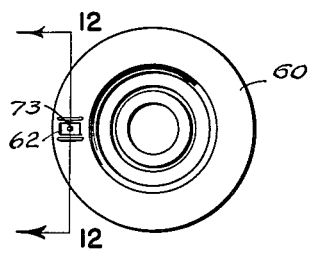
FIG. 11
FIG. 12
INVENTOR.
Paul A. Raiche
BY
Nathaniel Frucht
ATTORNEY

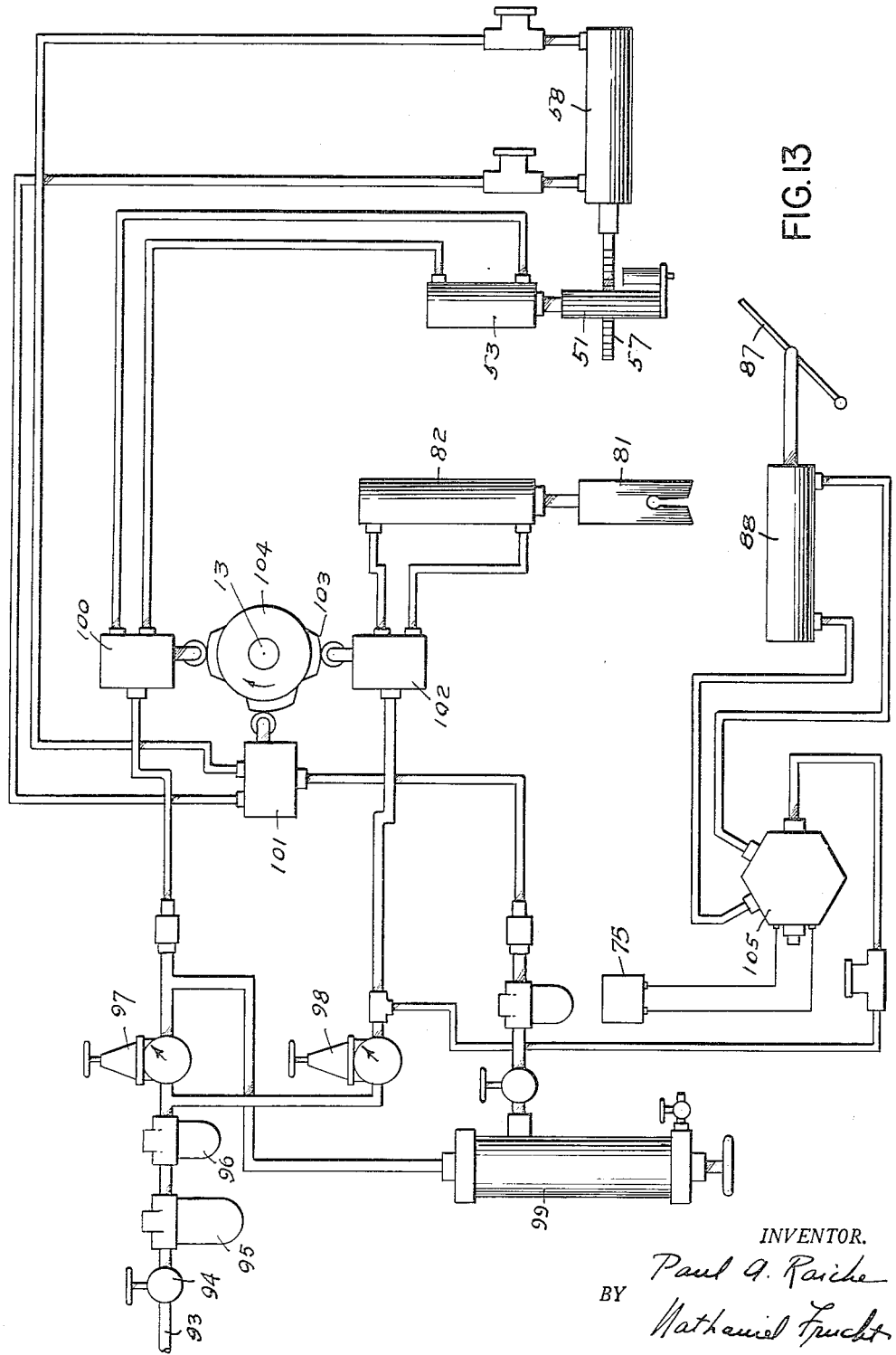

United States Patent Office 2,741,311
Patented Apr. 10, 1956

2,741,311
MACHINE FOR CENTERING NIPPLES AND PUNCHING VENT OPENINGS THERETHROUGH

Paul A. Raiche, North Providence, R. I., assignor to Davol Rubber Company, a corporation of Rhode Island Application March 20, 1952, Serial No. 277,574

7 Claims. (Cl. 164—87)

The present invention relates to the manufacture of nursing nipples, and has particular reference to the construction of a machine for punching vent openings therethrough.

The principal object of the invention is to provide a novel machine for centering nipples and punching vent openings therethrough.

A further object of the invention is to provide mechanism for separating nipples which are properly punched from defectively punched nipples.

Another objection of the invention is to provide a machine into which nipples having a base flange groove are inserted and indexed, the nipples being successively aligned in punch receiving position, then mechanically inspected, punched, and ejected to a storage container.

With the above and other objects and advantageous features in view, the invention consists of a novel arrangement of parts more fully disclosed in the detailed description following, in conjunction with the accompanying drawings, and more specifically defined in the claims appended thereto.

In the drawings,

Fig. 3 is an enlarged front view of the aligning, punching, inspection, ejecting, and mechanical sorting mechanism parts being omitted for clearness;

Fig. 4 is a section on the line 4—4 of Fig. 3;

Fig. 5 is an enlarged sectional detail of the aligning mechanism;

Fig. 6 is an enlarged sectional detail of the punching mechanism and the associated groove centering element, the groove centering mechanism being shown in centering position;

Fig. 7 is a section on the line 7—7 of Fig. 4, the punch being in punching relation to a nipple;

Fig. 8 is a detail view of the vent opening inspection parts;

Fig. 9 is a detail view of the nipple ejector, the nipple being shown in partly ejected position;

Fig. 10 is a plan view of a punched nipple, partly in section;

Fig. 11 is a bottom plan view thereof;

Fig. 12 is an enlarged sectional detail on the line 12—12 of Fig. 11; and

Fig. 13 is a schematic diagram of the hydraulic operating circuit.

Figure 1:
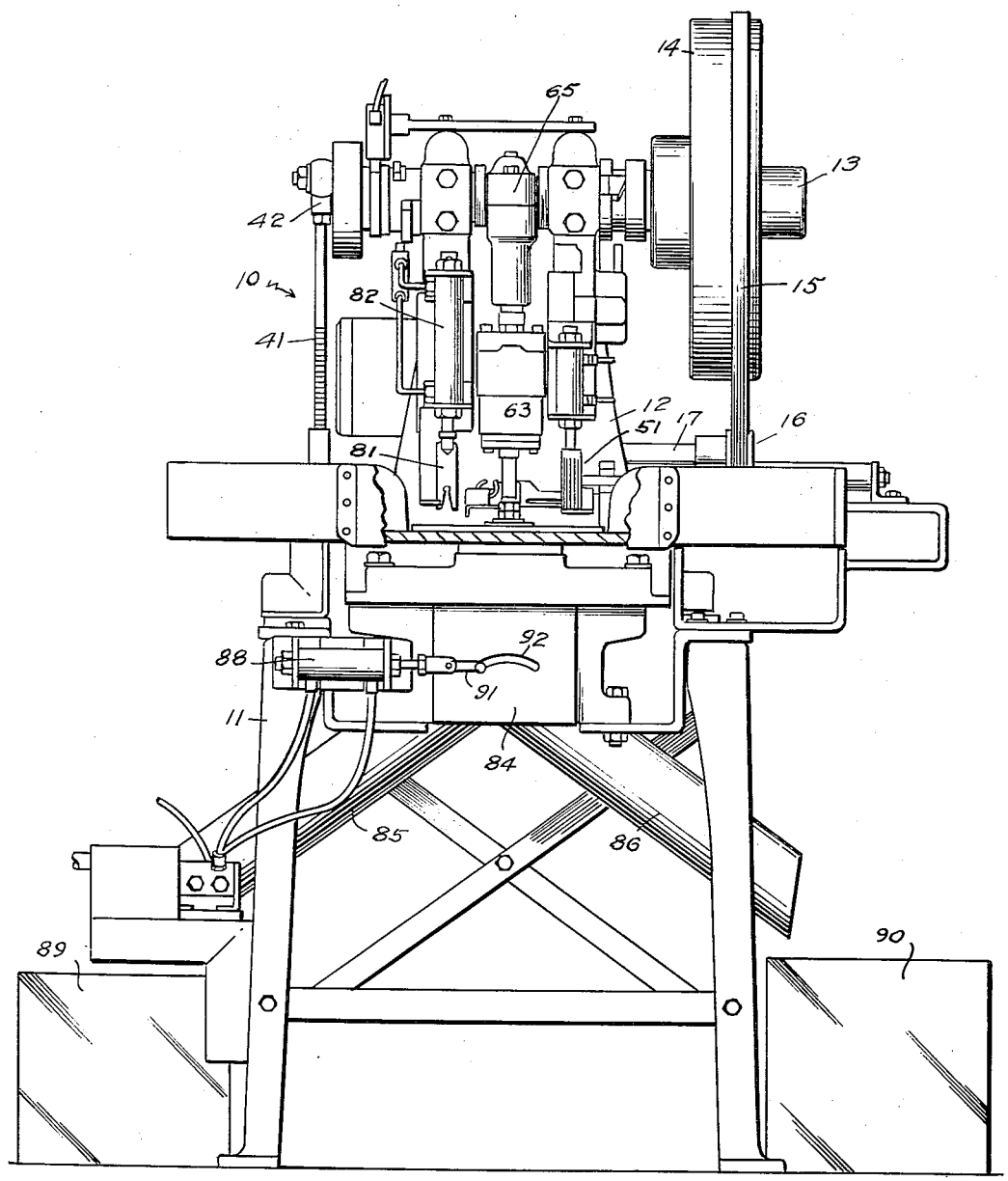
Fig. 1 is an elevation of a preferred construction of punching machine embodying the invention, parts being in section.
Figure 2:
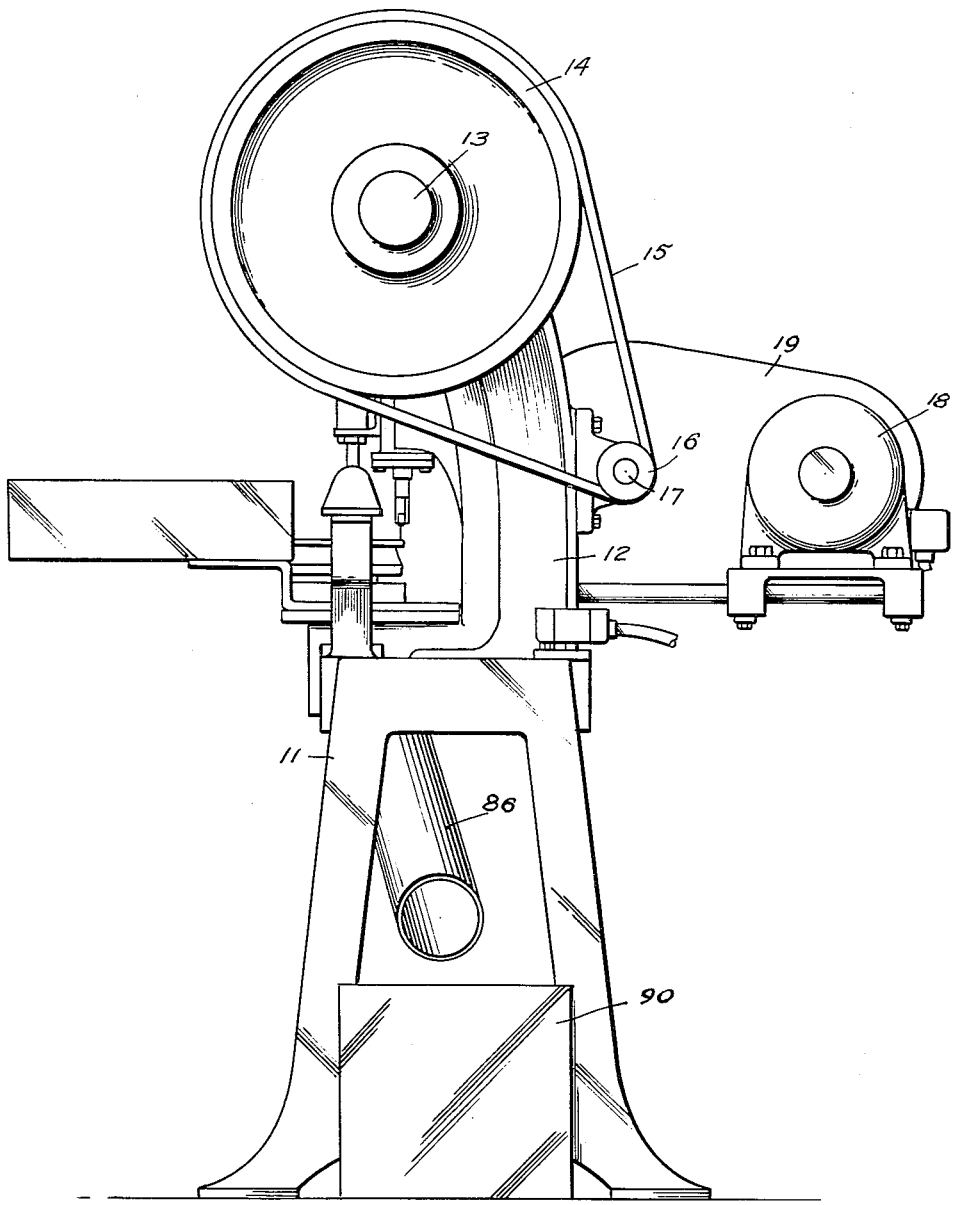
Fig. 2 is a side elevation thereof.

The nipples to which the present invention relates are of the base flange type, which are adapted to be mounted on the neck of a medium mouth nursing bottle and releasably locked in place by a retaining collar threadedly engaging the bottle neck. The preferred nipple construction includes a groove or recess in the lower surface of the base flange, and a vent opening centered in the groove or recess and extending through the adjacent base flange material.

It has been found desirable to provide a machine for receiving nipples to be punched with a vent opening, which turns the received nipples to orient them in punching position, centers the nipple base groove, and then, after punching, checks the nipples and ejects properly punched nipples to a storage container and improperly punched nipples to a reject nipple container. To this end, I have devised a punching machine into which the nipples are inserted, and which then completes all the operations automatically.

Referring to the drawings, the novel machine 10 includes a suitable support 11 on which the working parts are mounted, these parts including a machine frame 12 in which a power shaft 13 is rotatably mounted, the shaft receiving power through a fly-wheel pulley 14, a belt 15, a pulley 16, and a cross shaft 17 operatively geared to a motor 18 through a suitable reduction gear assembly 19.

The indexing mechanism

The nipples to be punched are indexed by a rotor disk 20, see Fig. 4, which is rotatably mounted on the support 11, and has a number of peripheral nipple-receiving through openings 21 which include an upper flange recess 22, a smaller cylindrical body recess 23, and a lower enlarged recess 24. The flange and body recesses have diametrically opposite channels 25 which lead directly to the lower recess 24, for permitting ejecting movement of an offset blade ejector as hereinafter described, these channels being angularly inclined as illustrated to become aligned with the offset blade ejector as hereinafter described, these channels being angularly inclined as illustrated to become aligned with the offset ejector blade.

The rotor disk 20 has a tapered upper peripheral surface 26 and an overhanding flange 27, and a cylindrical lower peripheral surface 28, and has a series of spaced peripheral notches or slots 29 as shown in Fig. 3, the lower portions of the slots 29 periodically receiving the end 30 of a pawl 31 pivoted at 32 to a horizontal rack 33, the lower end of the rack 33 being inset and the pawl having an upstanding tooth 34 which is resiliently pressed outwardly by a spring pressed plunger 35 seated in a bore 36 in the inset lower end of the rack 33. The rack 33 is horizontally reciprocated by a rotatable annular gear 37 keyed to a shaft 38 extending through a support housing 39 and having a drive gear 40 which is rotated by a vertical rack 41 depending from an eccentric disk 42 secured to the outer end of the shaft 13, see Fig. 1. The rack 33 has its lower end guide in a housing 43, see Fig. 4.

A rotor disk stop is provided, comprising a lever 44 pivoted at 45 to the support 11 and having a finger 46 adapted to successively seat in the upper portions of the peripheral rotor slots 29. The outer end 47 of the lever 44 is resiliently pressed by a movable spring pressed plunger 48 seated in a suitable bore in the housing 43, and seats in a slot 49 of the rack 33, and a stop blade 50 is fixed to the lever 44 and extends below the flange 27 of the rotor disk as hereinafter described. As the rotor disk is indexed by the pawl 31, the finger 46 rides on the rotor periphery and enters the slots 29 to prevent backlash.

The nipple orienting mechanism

The nipple orienting mechanism is shown in Figs. 3 and 5, and includes a gear cylinder 51 mounted on a piston rod 52 of a hydraulic motor 53. Attached to the lower end of the gear cylinder 51 is a support plate 52a apertured to permit outward resilient movement of an offset plunger 53 carrying a terminal pin 54 and housed in a shell 55 secured to the plate 52a, the shell 55 having a compression spring 56 which presses down on the plunger 53. A reciprocable rack 57 is mounted for intermittently reciprocation by the piston rod of a hydraulic cylinder 58, the rack being provided with a housing guide 59.

At each dwell of the rotor disk, the gear 51 moves down to engage the plunger pin 54 with the surface of the base flange 60 of a nipple 61 which had previously been inserted in the opening 21 of the rotor disk with its flange uppermost and the flange groove unoriented with respect to the disk and the subsequent piercing and inspecting operations, and the rack 57 advances to turn the gear 51 and the plunger pin until the plunger pin enters the groove 62 of the nipple flange, see Fig. 11, the continuing rotary movement then turning the nipple in its opening 21 to orient the groove properly for the subsequent operations. The turning is in excess of a complete revolution to ensure entry of the plunger pin in the groove and completion of the necessary nipple rotation.

The piercing mechanism

The oriented nipple is now indexed by the rotor disk to a dwell position directly under a compression spring type punch 63, see Fig. 7, which has a replaceable depending piercing pin 64, the punch being actuated by an eccentric mechanism 65 mounted on the power shaft 13. Since the nipple groove 62 must be positioned directly under the piercing pin, an aligning triangular finger 66 is mounted on a spring wire 67, see Fig. 6, the outer end of the spring wire being adjustably secured in a slot 68 of a bracket 69 secured to the punch 63, whereby the finger 66 first enters the groove 62 as the punch descends. The rotor disk, see Fig. 7, has its flange 27 overhanging the upper inclined portion 26, whereby a rotatably settable die element 70 which has an upper disk 71 with pin receiving openings 72, which may be of different sizes to cooperate with piercing pins of different sizes, may be mounted to underlie the punch piercing pin 64, whereby a vent opening 73 is punched in the groove area. The finger 66 preliminarily contacts the groove 62 and keeps the nipple and its groove steady for the impact of the piercing pin and during the initial withdrawal of the piercing pin, and thus prevents lifting of the nipple on the ascending piercing pin.

Vent inspection mechanism

The rotor disk now indexes to a dwell position under a vent inspection mechanism 74, see Fig. 3, which is mounted on the punch bracket 69 and thus descends with the punch. The mechanism 74 includes a microswitch 75, see Fig. 8, and a feeler finger 76 which is mounted on a wire 77 secured to the microswitch housing, and preferably spring pressed in slightly spaced adjacent relation to the contact 78 of the microswitch. As the punch descends on its vent piercing stroke the feeler finger 76 enters into the groove of the nipple directly below, which has already been pierced; the support plate 50 which is preferably Z-shaped has a portion 79 positioned directly under the groove. If the nipple had been improperly pierced, the groove would not be in position to be entered by the feeler finger, whereupon the feeler finger is pressed upwardly by the base flange to actuate the microswitch and thus initiate mechanism to reject the improperly pierced nipple. The properly pierced nipple is thus inspected and passed.

The ejecting machanism

The rotor disk now indexes to a dwell position with the pierced, inspected nipple directly below an ejector mechanism 80, see Figs. 3 and 9. The ejector mechanism 80 includes a blade 81, preferably bifurcated as illustrated, which is adjustably mounted on the piston rod of a hydraulic motor 82 mounted on the frame 11. The blade 81 is reciprocated through the slots 25 in the rotor nipple openings 21, guided by a fixed U-guide 81a to thrust the pierced inspected nipples through the rotor disk into a passage 83 leading to a chamber 84, see Fig. 3. The chamber 83 has two outlet conduits 85, 86, which have a swinging control gate 87 actuated by a hydraulic motor 88, whereby the pierced nipples are selectively dropped into a finished product container 89 or a reject container 90, see Fig. 1, the position of the gate 86 being controlled by the inspection mechanism 75. The piston rod of the motor 88 is connected to the gate 87 by a swinging link 91, and the outer wall of the chamber 84 is therefore provided with an arcuate slot 92 to permit the arcuate movement.

The hydraulic operating system

The preferred hydraulic operating system is shown in Fig. 13, and includes a hydraulic inflow conduit 93 having a stop valve 94 and traps 95, 96, regulating valves 97, 98, a pressure tank 99, and operating valves 100, 101, and 102 for the turn gear aligning motor 53, the rack motor 58, and the ejector motor 82, the control valves being operated by cams 103 on a cam drum 104 keyed to the power shaft 13. A separate solenoid operated valve 105 controls the ejector gate motor 88 for shifting the gate 87 to reject position on actuation of the inspection micro-switch mechanism 74. Other control valves, traps, drainage cocks and the like may be provided as required for efficient hydraulic operation.

Operation of the mechanism

The operation of the novel piercing apparatus is believed clear. An operator places the nipples in succession in the rotor disk openings, and the rotor disk indexes and periodically dwells; in each dwell period, one nipple is turned into piercing position, one nipple is punched after being position gauged, one nipple is inspected, and one nipple is ejected. The machine is thus automatic in action, improperly punched nipples being rejected to a special container.

Although I have disclosed a specific embodiment of the invention, it is obvious that changes in the size, shape, and operation of the parts may be made to meet different nipple punching and piercing requirements, and to adapt the machine to punching and piercing operations for other articles, without departing from the spirit or the scope of the invention as defined in the appended claims.

I claim:

1. A piercing apparatus for nipples having a base flange with a groove on the lower surface of the flange, comprising a rotatable disk having spaced openings for receiving nipples therein with their flanges uppermost, the nipple grooves being unoriented with respect to the disk, means for indexing the disk to bring the nipples to successive dwell points, means to rotate the nipple in its opening at the first dwell point and orient the groove at a predetermined point on the disk, means at another dwell point to pierce the nipple through the oriented groove, and means at another dwell point to eject the pierced nipple from the disk.

2. In the combination of claim 1, means for holding the nipple steady during the piercing operation.

3. In the combination of claim 2, means for inspecting the pierced nipple.

4. In the combination of claim 3, said inspection means including a feeler finger adapted to enter into the pierced nipple groove.

5. In the combination of claim 4, means for ejecting a properly pierced nipple to one receptacle and an improperly pierced nipple to another receptacle.

6. In the combination of claim 5, said ejecting means comprising a reciprocable blade adapted to enter the nipple and thrust the entered nipple through the disk.

7. In the combination of claim 6, said ejecting means having an exit gate shiftable in accordance with the extent of movement of the inspection feeler finger to selectively guide the ejected nipple to said receptacle.

References Cited in the file of this patent

UNITED STATES PATENTS

| | | |
|---|---|---|
| 524,610 | Richards | Aug. 14, 1894 |
| 1,144,045 | Mahoney | June 22, 1915 |
| 1,779,641 | Rockwood | Oct. 28, 1930 |
| 1,932,571 | Blood | Oct. 31, 1933 |
| 2,564,354 | Conner | Aug. 14, 1951 |
| 2,566,243 | Nyquist | Aug. 28, 1951 |